US011907645B2

(12) United States Patent
Hunigan et al.

(10) Patent No.: US 11,907,645 B2
(45) Date of Patent: Feb. 20, 2024

(54) SYSTEM AND COMPUTER-IMPLEMENTED METHOD FOR IN-PAGE REPORTING OF USER FEEDBACK ON A WEBSITE OR MOBILE APP

(71) Applicant: Verint Americas Inc., Alpharetta, GA (US)

(72) Inventors: Michael B. Hunigan, Florissant, MO (US); Alexei White, San Francisco, CA (US)

(73) Assignee: Verint Americas Inc., Alpharetta, GA (US)

( * ) Notice: Subject to any disclaimer, the term of this patent is extended or adjusted under 35 U.S.C. 154(b) by 28 days.

(21) Appl. No.: 17/582,327

(22) Filed: Jan. 24, 2022

(65) Prior Publication Data

US 2022/0222423 A1 Jul. 14, 2022

Related U.S. Application Data

(63) Continuation of application No. 15/693,890, filed on Sep. 1, 2017, now Pat. No. 11,232,252.
(Continued)

(51) Int. Cl.
  *G06F 9/451* (2018.01)
  *G06F 16/957* (2019.01)
  *G06F 40/143* (2020.01)

(52) U.S. Cl.
  CPC ............ *G06F 40/143* (2020.01); *G06F 9/451* (2018.02); *G06F 16/9577* (2019.01)

(58) Field of Classification Search
  CPC ..... G06F 9/451; G06F 16/9577; G06F 40/143
  See application file for complete search history.

(56) References Cited

U.S. PATENT DOCUMENTS 6,877,007 B1 * 4/2005 Hentzel .................. G06Q 30/02
  709/224
7,043,546 B2 * 5/2006 Smith .................. G06F 11/3414
  714/E11.193
(Continued)

FOREIGN PATENT DOCUMENTS

WO 2007/113573 10/2007
WO 2009/139994 11/2009
(Continued)

OTHER PUBLICATIONS

Michail N. Giannakos et al, "Making Sense of Video Analytics: Lessons Learned from Clickstream Interactions, Attitudes, and Learning Outcome in a Video-Assisted Course", International Review of Research in Open and Distance Learning, 16(1), 260-283, retrieved on Apr. 18, 2023. (Year: 2015).*
(Continued)

*Primary Examiner* — Shourjo Dasgupta
(74) *Attorney, Agent, or Firm* — Meunier Carlin & Curfman LLC

(57) ABSTRACT

Computer-implemented techniques are disclosed for presenting an in-page console on a website for reviewing interaction data captured during user interaction with one or more web pages of the website. The web browser activates the in-page console via an activation procedure. One or more of the web pages of the website are selected after activation of the in-page console. A feedback badge on the website can be replaced with a reporting badge upon activation of the in-page console and with the reporting badge displaying an indicator of interaction data captured for the selected web page. The in-page console is overlaid one or more of the selected web pages. The in-page console displays the interaction data, or recordings of user interaction, captured during user interaction with the selected web page to enable
(Continued)

review of the captured interaction data for the selected web page overlaid on the selected web page.

24 Claims, 17 Drawing Sheets

Related U.S. Application Data

(60) Provisional application No. 62/382,545, filed on Sep. 1, 2016.

(56) References Cited

U.S. PATENT DOCUMENTS

| | | | | |
|---|---|---|---|---|
| 7,231,606 | B2* | 6/2007 | Miller | H04L 67/02 |
| | | | | 702/186 |
| 7,941,525 | B1* | 5/2011 | Yavilevich | G06Q 30/02 |
| | | | | 709/224 |
| 8,930,818 | B2 | 1/2015 | Cordasco | |
| 9,405,665 | B1 | 8/2016 | Shashi et al. | |
| 9,438,694 | B1 | 9/2016 | Ochesel et al. | |
| 9,531,825 | B1* | 12/2016 | Brooks | H04L 67/535 |
| 9,577,889 | B1 | 2/2017 | Dumitrascu et al. | |
| 9,766,769 | B1 | 9/2017 | Webber et al. | |
| 10,083,159 | B1 | 9/2018 | Bekmambetov et al. | |
| 2001/0034638 | A1* | 10/2001 | Kelley | G06Q 30/02 |
| | | | | 705/7.29 |
| 2002/0010769 | A1* | 1/2002 | Kippenhan, III | G06F 16/957 |
| | | | | 705/28 |
| 2002/0083025 | A1* | 6/2002 | Robarts | G06F 21/6245 |
| | | | | 706/12 |
| 2002/0186237 | A1 | 12/2002 | Bradley et al. | |
| 2003/0053420 | A1* | 3/2003 | Duckett | H04L 67/025 |
| | | | | 370/252 |
| 2003/0142122 | A1* | 7/2003 | Straut | G06F 11/3476 |
| | | | | 714/E11.193 |
| 2003/0164850 | A1* | 9/2003 | Rojewski | G06F 16/957 |
| | | | | 707/E17.119 |
| 2004/0119682 | A1* | 6/2004 | Levine | G06F 3/04812 |
| | | | | 345/158 |
| 2004/0261026 | A1* | 12/2004 | Corson | G06F 9/45512 |
| | | | | 700/88 |
| 2004/0267820 | A1* | 12/2004 | Boss | H04L 67/568 |
| 2005/0213246 | A1* | 9/2005 | Kief | G11B 5/1272 |
| 2006/0005132 | A1 | 1/2006 | Herdeg | |
| 2007/0043608 | A1 | 2/2007 | May et al. | |
| 2007/0067297 | A1 | 3/2007 | Kublickis | |
| 2007/0250618 | A1* | 10/2007 | Hammond | H04L 43/08 |
| | | | | 709/224 |
| 2007/0300179 | A1* | 12/2007 | Friedlander | G06Q 10/06 |
| | | | | 715/781 |
| 2008/0046562 | A1 | 2/2008 | Butler | |
| 2008/0052392 | A1* | 2/2008 | Webster | G06Q 30/02 |
| | | | | 709/224 |
| 2008/0119131 | A1* | 5/2008 | Rao | G06Q 30/0217 |
| | | | | 455/3.04 |
| 2009/0063968 | A1* | 3/2009 | Wenig | H04L 67/14 |
| | | | | 709/224 |
| 2009/0235187 | A1 | 9/2009 | Kim et al. | |
| 2010/0095208 | A1* | 4/2010 | White | H04L 67/535 |
| | | | | 715/704 |
| 2010/0251128 | A1 | 9/2010 | Cordasco | |
| 2010/0325540 | A1 | 12/2010 | Biazetti et al. | |
| 2011/0107241 | A1* | 5/2011 | Moore | G06F 16/958 |
| | | | | 709/224 |
| 2011/0125594 | A1 | 5/2011 | Brown et al. | |
| 2011/0173239 | A1* | 7/2011 | Sayed | G06F 11/3414 |
| | | | | 718/1 |
| 2011/0231265 | A1 | 9/2011 | Brown et al. | |
| 2011/0246879 | A1* | 10/2011 | White | G06F 16/958 |
| | | | | 715/704 |
| 2012/0023407 | A1 | 1/2012 | Taylor | |
| 2012/0164937 | A1* | 6/2012 | Rao | G06Q 30/0245 |
| | | | | 455/2.01 |
| 2013/0004930 | A1* | 1/2013 | Sorenson | G09B 7/02 |
| | | | | 434/350 |
| 2013/0014146 | A1* | 1/2013 | Bhatia | H04N 21/4821 |
| | | | | 725/14 |
| 2013/0024731 | A1* | 1/2013 | Shochat | G06F 11/3612 |
| | | | | 714/38.1 |
| 2013/0104041 | A1 | 4/2013 | Seshagiri et al. | |
| 2013/0136253 | A1* | 5/2013 | Liberman Ben-Ami | |
| | | | | H04M 3/5191 |
| | | | | 379/265.09 |
| 2014/0068498 | A1 | 3/2014 | Olsen et al. | |
| 2014/0115482 | A1* | 4/2014 | Petkov | G06Q 30/0203 |
| | | | | 715/738 |
| 2014/0223281 | A1 | 8/2014 | Bocanegra Alvarez | |
| 2014/0280517 | A1* | 9/2014 | White | H04L 67/04 |
| | | | | 709/203 |
| 2015/0032509 | A1 | 1/2015 | Fuentes et al. | |
| 2015/0046909 | A1 | 2/2015 | Ligman et al. | |
| 2015/0331553 | A1* | 11/2015 | Shaffer | G06Q 50/00 |
| | | | | 715/765 |
| 2015/0348071 | A1* | 12/2015 | Cochrane | G06Q 30/0203 |
| | | | | 705/7.32 |
| 2016/0011755 | A1 | 1/2016 | Douek et al. | |
| 2017/0017700 | A1* | 1/2017 | Mehrotra | H04L 51/216 |
| 2017/0019489 | A1* | 1/2017 | Churchill | G06Q 30/0201 |
| 2017/0116104 | A1 | 4/2017 | Abou Mahmoud et al. | |
| 2017/0323026 | A1 | 11/2017 | Le Bras et al. | |

FOREIGN PATENT DOCUMENTS

| | | | | |
|---|---|---|---|---|
| WO | WO-2010026582 | A2* | 3/2010 | ......... G06Q 30/0241 |
| WO | WO-2018010823 | A1* | 1/2018 | ............. A63F 13/00 |

OTHER PUBLICATIONS

Gang Wang et al, "Unsupervised Clickstream Clustering for User Behavior Analysis", CHI 2016, May 7-12, 2016, San Jose, CA, USA, retrieved on Apr. 18, 2023. (Year: 2016).*

Christian Rohrer, "When to Use Which User-Experience Research Methods", original publication on Oct. 12, 2014 and updated publication on Jul. 17, 2022 at https://www.nngroup.com/articles/which-ux-research-methods/, retrieved on Apr. 18, 2023. (Year: 2022).*

International Search Report and Written Opinion, dated Nov. 7, 2017, received in connection with corresponding International Patent Application No. PCT/US2017/049901.

* cited by examiner

FIG. 12

SYSTEM AND COMPUTER-IMPLEMENTED METHOD FOR IN-PAGE REPORTING OF USER FEEDBACK ON A WEBSITE OR MOBILE APP

CROSS-REFERENCE TO RELATED APPLICATIONS

This application is a continuation of U.S. application Ser. No. 15/693,890 filed Sep. 1, 2017, which claims benefit of U.S. Provisional Application No. 62/382,545, filed Sep. 1, 2016, which are hereby incorporated herein by reference in its entirety.

BACKGROUND

1. Field of the Invention

The disclosure relates to reviewing feedback collected from end users on a website or mobile application using a unique in-page interface solution having integrated capabilities for replaying user interaction with the website.

2. Description of Related Art

It is known to provide end user feedback for websites in effort to improve the website experience, or the like. However, this feedback, when reviewed by the website administrator, is accumulated on a site or interface that is contextually disconnected from the website. When reviewing the feedback, the website owner often must go back and forth between the feedback review site and the webpage to try to understand the context of the feedback. Additionally, conventional systems and methods of feedback provide no context into how the user is actually interacting with the web page. Such contextual disconnection has proven burdensome on website administrators and has devalued the feedback provided for the website.

SUMMARY

One embodiment of a computer-implemented method is provided. The computer-implemented method presents an in-page console on a website for reviewing interaction data captured during user interaction with one or more web pages of the website. The method comprises the step of activating, with a web browser, the in-page console via an activation procedure. One of the web pages of the website is selected after activation of the in-page console. The in-page console is overlaid on the selected web page and the in-page console displays the interaction data captured during user interaction with the selected web page to enable review of the captured interaction data for the selected web page overlaid on the selected web page.

One embodiment of a computer-implemented method of composing and presenting a recording of interaction with a selected web page of a website is provided. The computer-implemented method comprises loading with a web browser a replay module to enable recording of interaction data during user interaction with the selected web page. The replay module records the interaction data during user interaction with the selected web page. The interaction data is processed to compose a replay visualization. An in-page console displays the replay visualization to enable review of the replay visualization for the selected web page overlaid on the selected web page.

One embodiment of a computer-implemented method of replacing a feedback badge on a selected web page of a website with a reporting badge is provided. The reporting badge is for reviewing interaction data captured during user interaction with the selected web page. The method comprises the steps of implementing, with the web browser, the feedback badge on the selected web page for enabling submission of feedback related to the selected web page. The web browser activates an in-page console via an activation procedure. The method comprises replacing the feedback badge with a reporting badge upon activation of the in-page console and with the reporting badge displaying an indicator of interaction data captured for the selected web page.

The systems, methods, and software disclosed herein provide dynamic review of feedback collected from end users on a website or mobile application using a unique in-page interface solution having integrated capabilities for replaying user interaction with the website or mobile application. The techniques described herein provide easy access to end users feedback and context for the feedback relative to the website by providing an intuitive feedback review interface that is overlaid directly on the website for which feedback is provided. An in-page console stays with the reviewer during the entire duration of scrolling through website or any of its pages. The system and method provide the in-page console over an unimpeded (fluid) view of client website. This is done by calling elements remotely, using an API, for example, such that the elements are not impeding or otherwise adversely affecting the website. The in-page console provides the ability to review a movie generated with respect to the end user's interaction with the webpage, thereby providing an even more in-depth and contextual review experience. The techniques described herein may exhibit advantages other than those described above.

BRIEF DESCRIPTION OF THE DRAWINGS

FIG. 12 is yet another sample screenshot of the analytics displayed in the in-page console.

DETAILED DESCRIPTION

Referring to the Figures, wherein like numerals indicate like or corresponding parts throughout several views, aspects of a system 100 and method 200 are provided for implementing an in-page console 102 to enable meaningful and contextual review of user feedback and/or interaction with a website or webpage wherein the in-page console 102 is displayed on the respective webpage or website front which selected feedback and/or interaction was derived.

Figure 1:
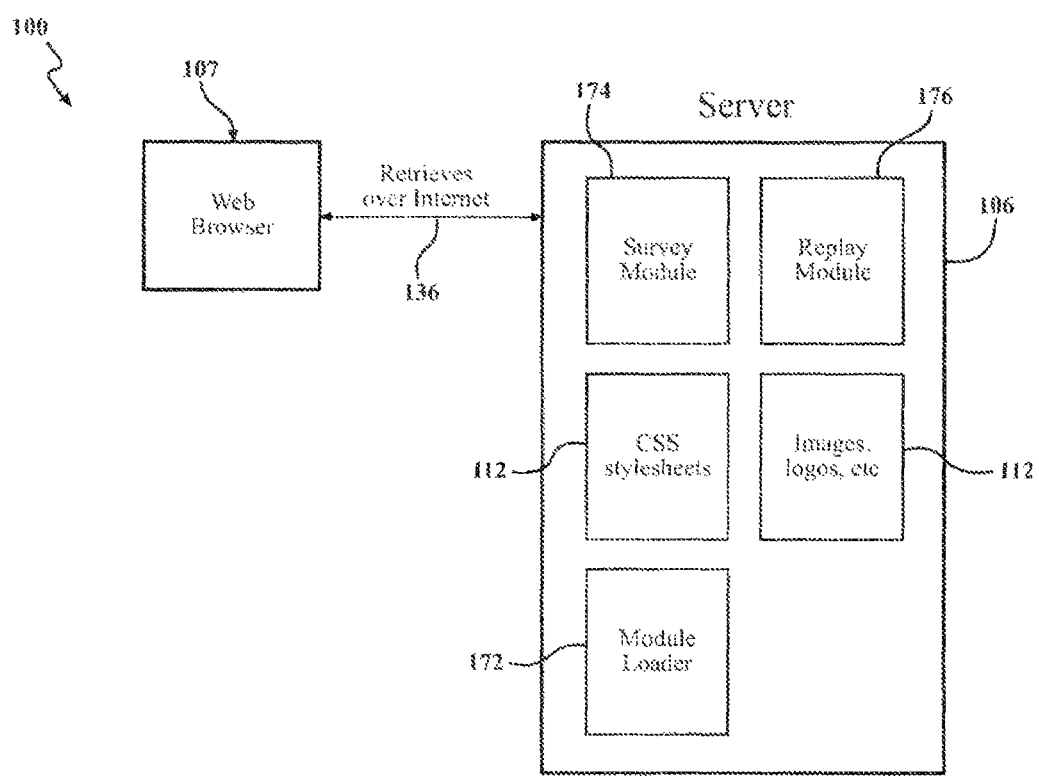
FIG. 1 is a layout of certain aspects of the system showing interface between a web browser and a server.
Figure 2:
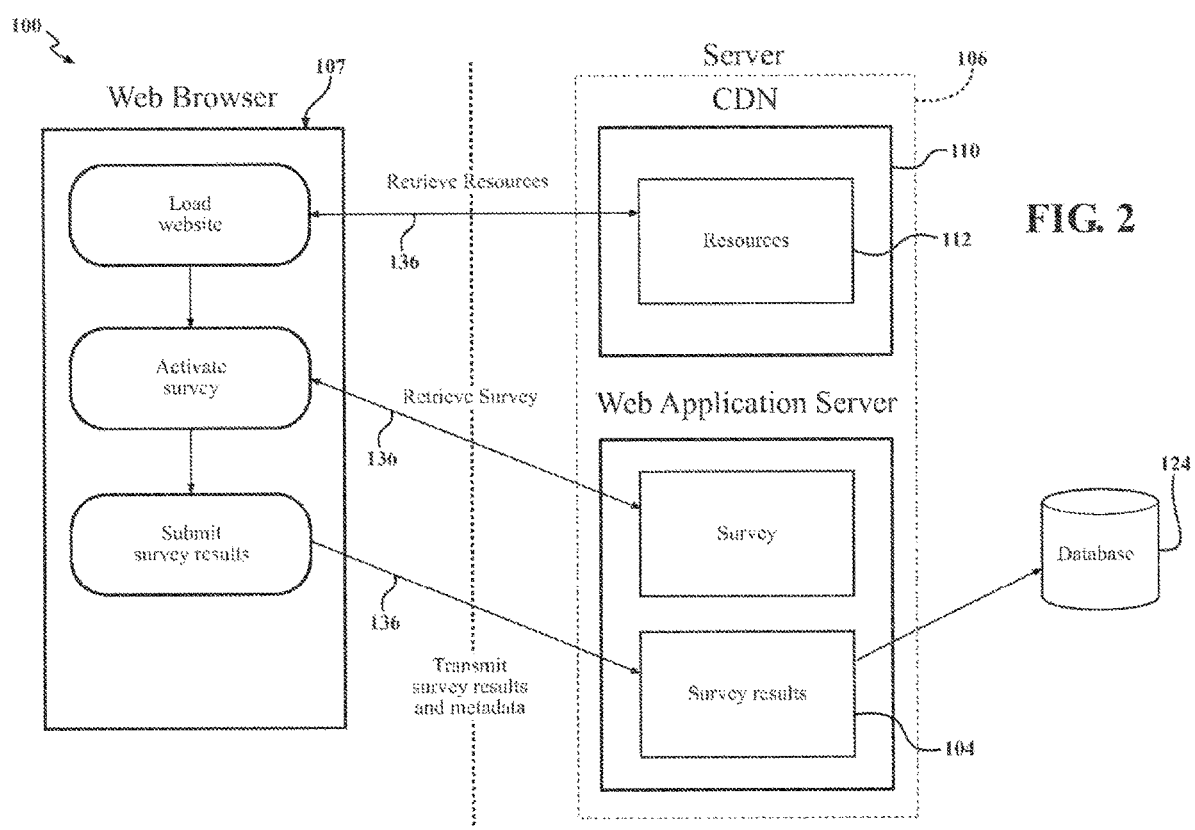
FIG. 2 is a layout of certain aspects of the system showing interface between the web browser and the server for implementing the method for collecting feedback from the webpage.

Referring to FIGS. 1 and 2, the system 100 includes a server 106 and at least one web browser 107. The sewer 106 is remotely connected to the at least one web browser 107 such that the server 106 and the web browser 107 may remotely exchange data. In some embodiments, the server 106 is remotely connected to multiple web browsers 107. The server 106 may be an application server, a web server, a communications server, a computing server, a rile server, a proxy server, a combination thereof, or any other suitable server for remotely communicating with a web browser 107. While in most embodiments, the server 106 remotely communicates with more than one web browser 107, remote communication between the server 106 and one web browser 107 is discussed herein for simplicity.

The system 100 further includes a website 108, a content delivery network (CDN) 110, and one or more resources 112. In some embodiments, the server 106 includes the CDN 110. For example, the CDN 110 may be implemented in hardware of the server 106. The web browser 107 presents the website 108 using data received from the server 106 and the CDN 110. The website 108 includes a plurality of web pages 114. The website 108 may be for example, a commerce website for selling goods or services, a social media website, an informational website, or any other type of website. The web pages 114 are navigated when the website 108 is accessed via the web browser 107. A user may browse the website 108 to navigate between several different web pages 114 and thereby access, for example, web pages related to product information, web pages for customer checkout, web pages for presenting information, or any other types of web pages. The web browser 107 may have any suitable configuration and may be any suitable type configured for a computer or mobile device.

The web browser 107 is remotely connected to both the CDN 110 and the server 106. The web browser 107 receives cascading style sheets (CSS), hypertext markup language (HTML), Javascript, or a combination thereof from the server 106 and/or the CDN 110 and uses the CSS, HTML, Javascript or combination thereof to present the website 108 and the web pages 114 thereof. The web browser 107 may receive the web pages 114 from the CDN 110 via hypertext transfer protocol (HTTP) The web pages 114 each include the one or more resources 112. The web browser 107 may receive the resources 112 from the CDN 110. The resources 112 include content that is displayed on the web pages 114. The resources 112 may be for example, images, text, URLs, fill able forms, or a combination thereof. The web pages 114 may load the resources 112 via a HTML fragment or tag, e.g. an HTML script.

Figure 3:
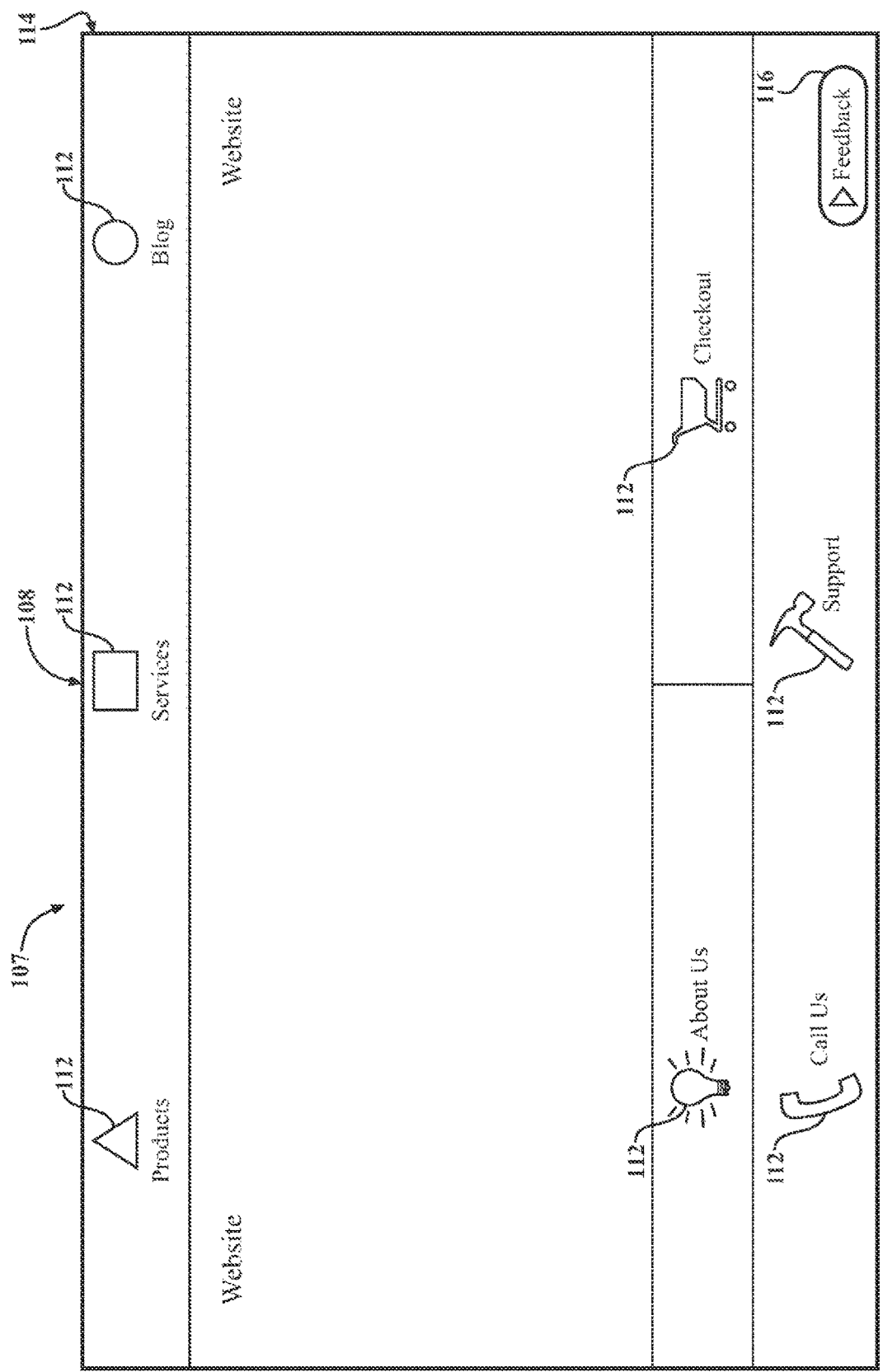
FIG. 3 is a sample screenshot of a web page of a website displayed on the web browser showing a feedback badge.

FIG. 3 shows one example of the website 108 in the context of the techniques described herein. The website 108 includes a survey badge 116. The survey badge 116 is implemented in the website 108 via a code segment included in code of the website 108 and received from the server 106. The system 100 further includes a survey 120. The survey badge 116 provides access to the survey 120. The survey badge 116 is presented on at least one web page of the plurality of web pages 114. The survey badge 116 may be presented as text, image, a combination thereof or any other suitable format. The survey badge 116 may be any suitable size, shape, color, or image. In some embodiments, the website 108 presents the survey badge 116 after one or more badge conditions, i.e. triggering criteria, have been met.

Figure 4:
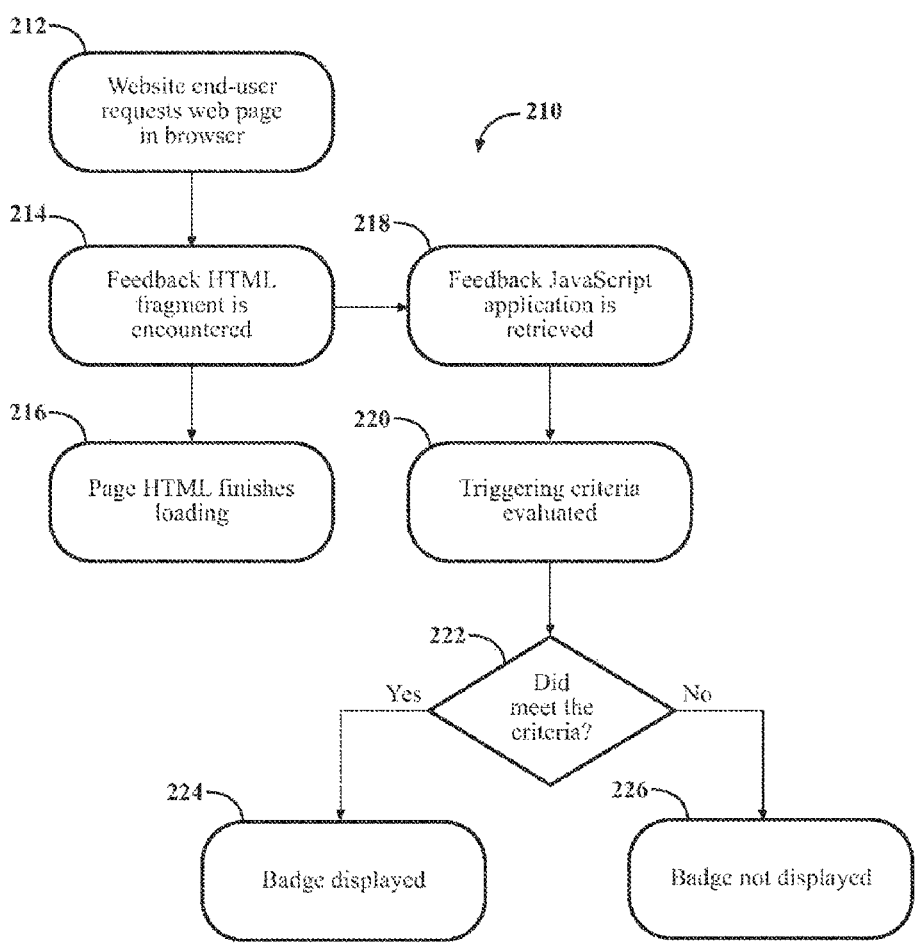
FIG. 4 is a sample flow chart of a method for determining whether to present a feedback badge on the webpage.

FIG. 4 illustrates an embodiment of a badge presentation process 210 for determining whether to present the survey badge 116 on the web page 114 being presented by the web browser 107. In some embodiments, the survey badge 116 is presented via HTML. The survey badge 116 may be implemented into code of the web page 114 via HTML tag. For example, an owner or a manager of the website 108 may paste or type an HTML tag into code of the website in order to implement the survey badge 116. In some embodiments, the survey badge 116 is activated by being clicked on by an end-user of the website 108.

Examples of badge conditions include random number generator result, time passage while presenting the web page 114, time passage while presenting the website 108, presentation of a number of web pages 114 on the website 108, presentation of the website 108 by the web browser 107 being run on a specific device or operating system, web browser configuration, previous completion of the survey 120, time of day, date, purchase of a product on the website 108, means of referral to the website 108, or a combination thereof. Random number generator result includes the web browser 107 or server using a random number generator, and the web browser 107 determining whether to display the survey badge based upon a comparison of a result of the random number generator to some other value. Time passage while presenting the website 108 includes, for example, waiting to present the survey badge until an end-user of the website 108 has browser the website for a total of three minutes. Presentation of a number of web pages 114 on the website 108 includes, for example, waiting to present the survey badge 116 until an end-user of the website 108 has browsed a total of five of the web pages 114. Presentation of the website 108 by the web browser 107 being run on a specific device or operating system includes, for example, checking a version of the web browser 107, or whether the web browser 107 is running on a mobile device or a desktop computer, and determining whether to present the survey badge 116 based upon results of the check.

Web browser configuration includes checking settings and configuration of the web browser 107, such as whether certain optional features are enabled or whether certain extensions are being used, and determining whether to present the survey badge 116 based upon results of the check. Previous completion of the survey includes checking whether an end-user previously completed the survey and determining whether the present the survey badge 116 based upon results of the check, time of day includes presenting tire survey badge 116 based upon whether the time of day is within time of day parameters when an end user is browsing the website 108. Date includes presenting the survey badge 116 based upon whether the date is within date parameters when an end user is browsing the website 108. Purchase of a product on the website 108 includes presenting the survey badge 116 based upon whether an end user has purchased one or more specific products while browsing the website 108. Means of referral to the website 108 includes presenting the survey badge 116 based upon how an end user arrived at the website, e.g. whether the end user arrived at the website 108 by clicking a link from a different website or from a search engine, or whether the end user arrived at the website by URL.

With continued reference to FIG. 4, the badge presentation process 210 includes a plurality of steps 212-226. At step 212, the user of the website, i.e. end-user, requests the web page 114 using the web browser 107. At step 214, the web browser 107 encounters feedback HTML code while loading the web page 114. The web browser 107 performs both of steps 216 and 218. At step 216, the web browser 107 then finishes loading HTML code to complete loading of the web page 114. At step 218, the web browser 107 retrieves from the server 106 a JavaScript application including the badge conditions. At step 220, the badge conditions are evaluated. At step 222. the web browser 107 determines whether to display the survey badge 116 based upon evaluations of the badge conditions. If the web browser 107 determines that the badge conditions are met, the web browser 107 proceeds to step 224 and displays the survey badge 116 on the web page 114. Conversely, if the web browser 107 determines that the badge conditions are not met, the web browser 107 proceeds to step 226 and does not display the survey badge 116 on the web page 114.

Figure 5:
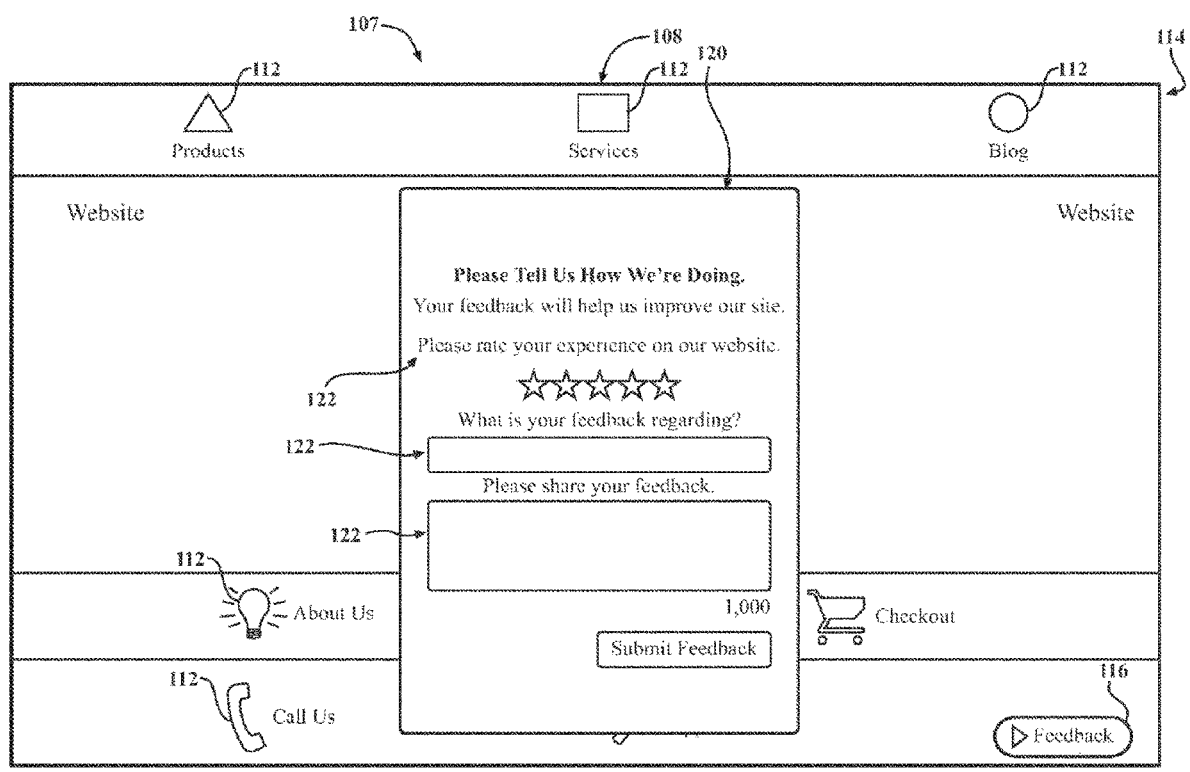
FIG. 5 is a sample screenshot of a survey overlaid on the web page.

As shown in FIG. 5, the survey 120 is designed to gather feedback from users of one or more of the web pages 114 of the website 108 regarding one or more features of the one or more web pages 114. The survey 120 is stored on the server 106. The survey 120 may be defined to gather feedback from users of the website 108 regarding one or more features of the website 108 via one or more survey elements 122. For example, the survey 120 may be defined to include a plurality of survey elements formed as questions regarding a product viewing interface, a checkout interface, one or more forms, or of specific features of the website 108 such as logos, menu formats, etc.

The survey 120 may be defined to include survey elements 122 for each of the features of the website 108, such as rating a feature on a numerical scale, giving verbal feedback regarding a feature, answering one or more questions regarding a feature, or any other method of obtaining feedback via survey questions. Examples of survey elements 122 include numeric ratings, drop-down lists, open-ended text fields, sliders containing numeric ratings, radio buttons, check boxes, color-changing toggle buttons, text dragging categorization, or image dragging categorization. In some embodiments, users are required to complete every survey element 122 of the survey elements 122. In other embodiments, users are required to complete one or more of the survey elements 122.

Upon completion of the survey 120, survey results 104 are transmitted to the server 106 by the web browser 107. In some embodiments, the server 106 stores the survey results 104 in a database 124. The database 124 is remote from the server 106. In some embodiments, the database 124 is a cloud storage database. The survey 120 may also be defined for features such as fonts, colors, and formatting as well as branching and conditional logic, language translations, and validation criteria. The validation criteria may include, for example, the survey elements 122 that must be answered by the end user, the survey elements 122 that are optional, and minimum and maximum answer length for the survey elements 122 that acquire text from the end user. The survey may be defined via HTML or DHTML. The survey 120 may be defined differently depending on whether the survey is or is not to be displayed on a mobile device. For example, when the survey 120 is to be displayed on a mobile device the survey 120 may be defined to use larger fonts, have a zoom feature locked, and/or use different input controls, such as touch controls. The survey elements 122 may also be different tor mobile devices.

The survey badge 116 presents the survey 120 when activated by an end user of the website 108. The survey badge 116 may be activated by the end user by clicking or tapping on the survey badge 116. The survey 120 is transmitted to the web browser 107 from the server 106 upon activation of the survey badge 116, such as via HTTP request. The survey 120 may be XML, JSON, CSV, or any other suitable format. The survey 120 may be overlaid onto the web page 114 such that the web page 114 remains on screen while the survey 120 is being taken, as is shown in FIG. 5. For example, the survey 120 may be overlaid onto the web page 114 via HTML frames. In some embodiments, the survey 120 is opened in a new window or a new tab of the web browser 107 upon activation.

The survey 120 may contain one or more sub-surveys. Each sub-survey contains one or more survey elements 122 for acquiring survey results 104 from users of the website 108 for one or more functions of the website 108, for example customer support functions, shopping checkout functions, or general functions. In some embodiments, a sub-survey of the one or more sub-surveys is only available to users via activation the survey badge 116 on a relevant web page 114 of the web pages 114. For example, a sub-survey containing survey 120 elements for acquiring survey results 104 for shopping checkout functions is available only via activation of the survey badge 116 on the checkout page. In some embodiments, the web browser 107 displays multiple sub-surveys upon activation of the survey badge 116.

Figure 15:
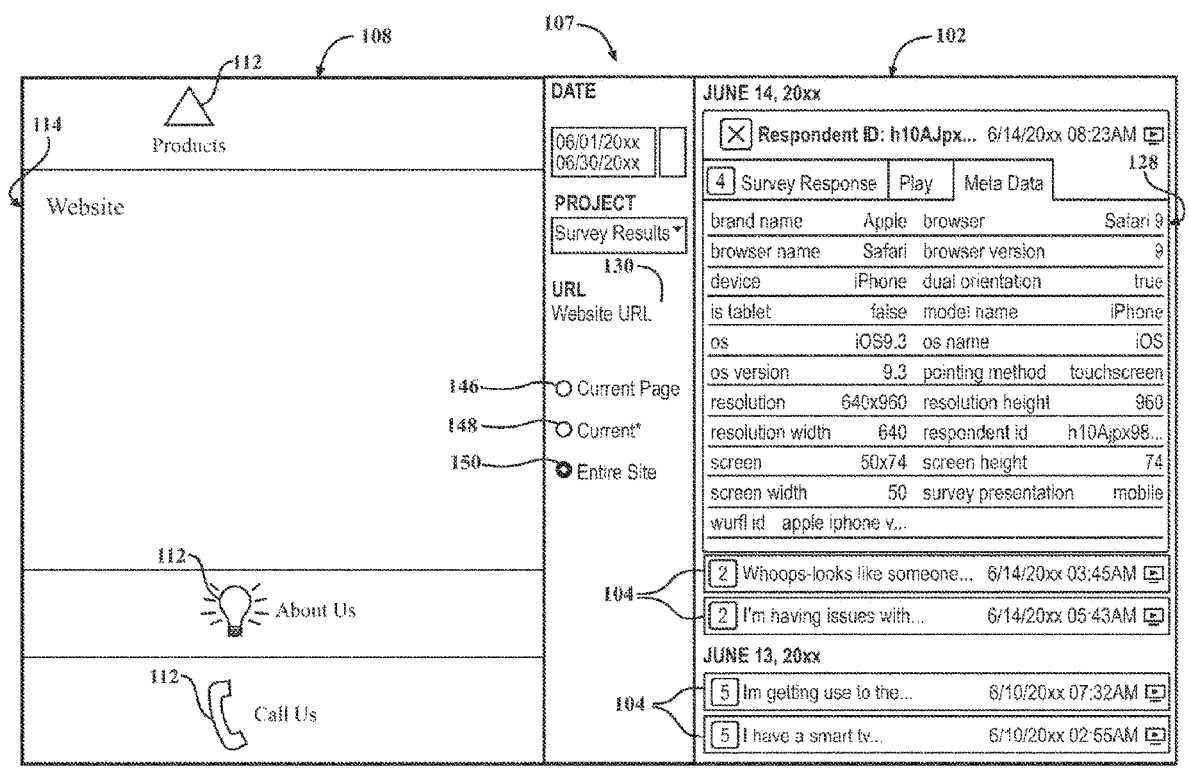
FIG. 15 is a sample screenshot of metadata being displayed in the in-page console.

The system 100 further includes metadata 128, as shown in FIG. 15. The survey results 104 are sent to the server 106 with the metadata 128. The metadata 128 is contextual information that provides context to the survey results 104. The metadata 128 may include a web address 130 or a Uniform Resource Locator (URL) of the web page 114 from which the survey badge 116 was activated, a web page identifier for identifying die web page 114 from which the survey badge 116 was activated, a history of which of the web pages 114 were visited prior to activation of the survey badge 116, or a combination thereof. The metadata 128 may also include information specific to the website 108, such as customer ID, shopping can contents, or foreign IDs for click-stream analytics. The history may include the web address 130, the URL, the web page identifier, time accessed, date accessed, GPS data when accessed, or a combination thereof of the web pages 114. The metadata 128 may include data specific to the website 108, such as customer login information, shopping cart contents, or other suitable data specific to the website 108. The metadata 128 may include third-party analytical data. The metadata 128 may include identification of the web browser 107, screen resolution, or a combination thereof.

Figure 6:
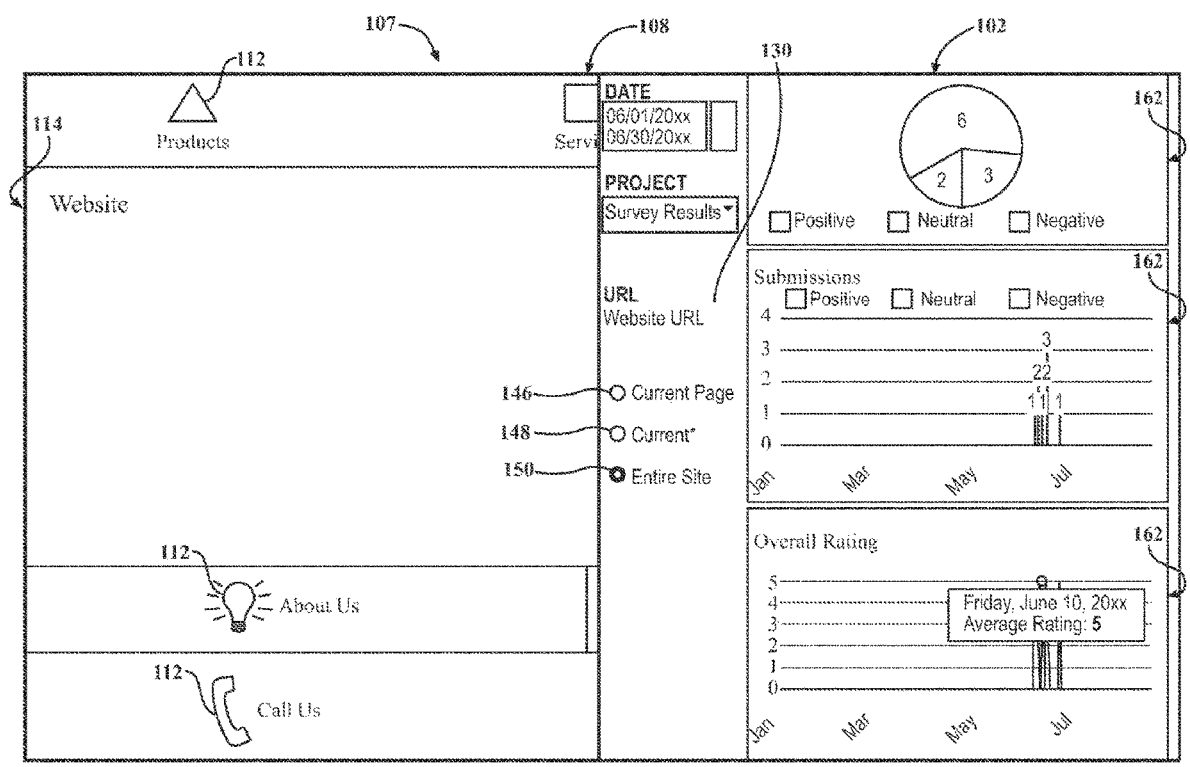
FIG. 6 is a sample screenshot of analytics displayed in an in-page console overlaid on the web page.
Figure 7:
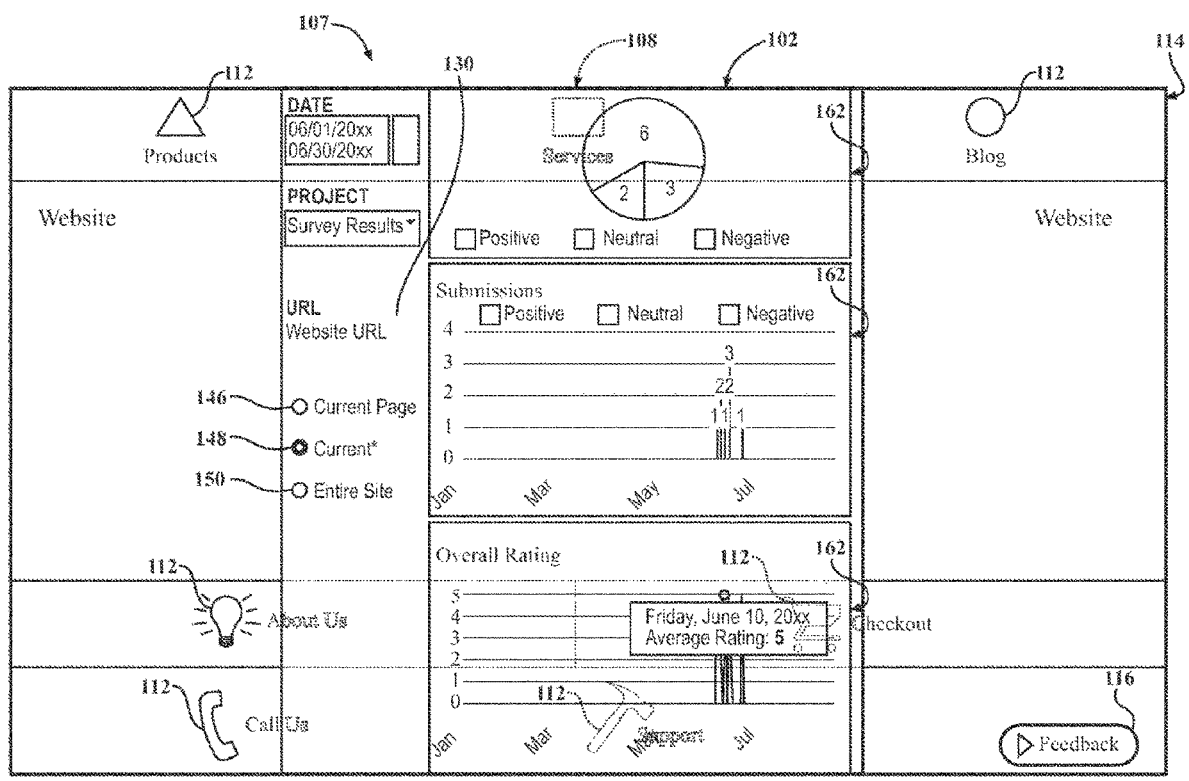
FIG. 7 is another sample screenshot of analytics displayed in an in-page console overlaid on the web page wherein the in-page console is transparent relative to the contents of the web page.
Figure 8:
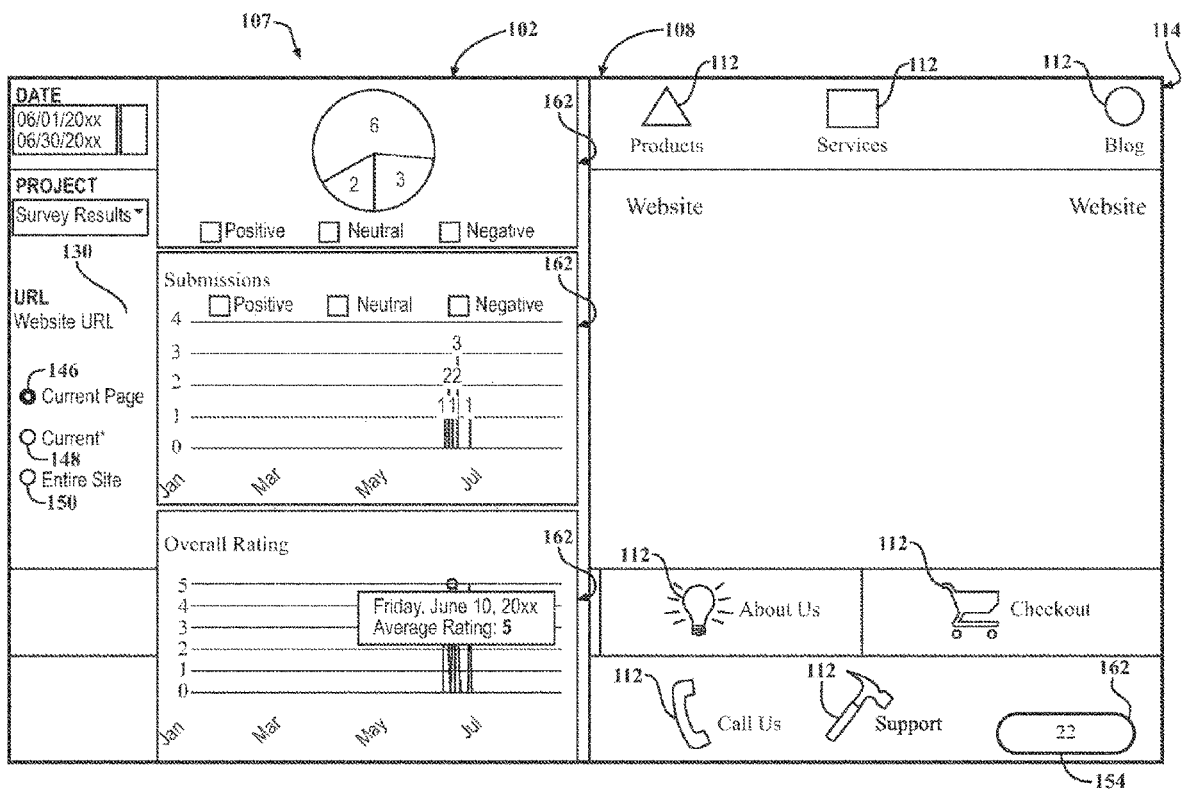
FIG. 8 is a sample screenshot of analytics displayed in an in-page console beside the web page in a separate window.

Referring now to FIGS. 6-8, the system 100 includes the in-page console 102. As will be understood from the examples herein, the in-page console 102 is an application interlace that facilitates access to the survey results 104 and the metadata 128 for a selected website or webpage directly "in-page" for the selected website or selected webpage. The in-page console 102 may be programmed using Javascript and may function via Javascript.

In some embodiments, the web browser 107 displays the in-page console 102 when the in-page console 102 is activated by the owner or the manager of the website 108 via an activation procedure. The web browser 107 overlays the in-page console 102 on top of the website 108. In some embodiments, shown in FIG. 6, the in-page console 102 is overlaid onto an edge of the web page 114 such that the in-page console 102 does not interfere with the web page 114. In embodiments, such as is shown in FIG. 7, the in-page console 102 is overlaid onto a middle portion of the web page 114 and is translucent such that the web page 114 is at least partially visible beneath the in-page console 102. In still other embodiments, such as is shown in FIG. 8, the in-page console is displayed beside the web page 114 in a separate window of the web browser 107. In one example, the in-page console 102 is overlaid via HTML frames.

The in-page console 102 may be overlaid and be programmed and function via any suitable method. In some embodiments, the activation procedure includes adding special text to the web address 130 or the URL, such as a hash fragment. An example of a hash fragment is "#acscommand=feedbackreport." In other embodiments, the activation procedure includes using a bookmarklet. The bookmarklet may be stored in the web browser 107. The bookmarklet loads the in-page console 102 within the currently displayed web page 114. In still other embodiments, the activation procedure includes use of a browser plugin. The browser plugin executes JavaScript to load the in-page console 102. The browser plugin may be implemented using any suitable technology.

Analytics 162 information may be derived from the survey results 104. In some embodiments, the analytics 162 include diagrammatical illustrations, such as charts, graphs, or a combination thereof. The in-page console 102 may display the analytics 162 for viewing by the owner or the manager of the website 108. In the example shown in FIG. 6, the in-page console 102 includes a current page button 148, a current*button 148, and an entire site button 150. The current page button 146 allows the owner or the manager of the website 108 to select viewing the survey results 104, the metadata 128, and the analytics 162 for the web page 114 currently being viewed. The current*button 148 allows the owner or the manager of the website 108 to select viewing the survey results 104. the metadata 128, and the analytics 162 aggregated for a custom selection, such as a plurality of web pages specified by the owner or the manager, from a plurality of end-users specified by the owner or the manager, or a combination thereof. The entire site button 150 allows the owner or the manager of the website 108 to select viewing the survey results 104, the metadata 128, and the analytics 162 aggregated for all of the web pages 114 of the website 108.

In some embodiments, the analytics 162 are displayed via charts, graphs, tables, or a combination thereof. In some embodiments, the analytics 162 include statistical analyses based upon the survey results 104. For example, the server 106 may receive several survey results 104 and process the survey results 104 to determine the analytics 162. The server 106 may then transmit the analytics 162 to the web browser 107 such that the web browser 107 may display the analytics 162 in the in-page console 102. The analytics 162 may be any suitable method of displaying information derived from the survey results 104.

Figure 9:
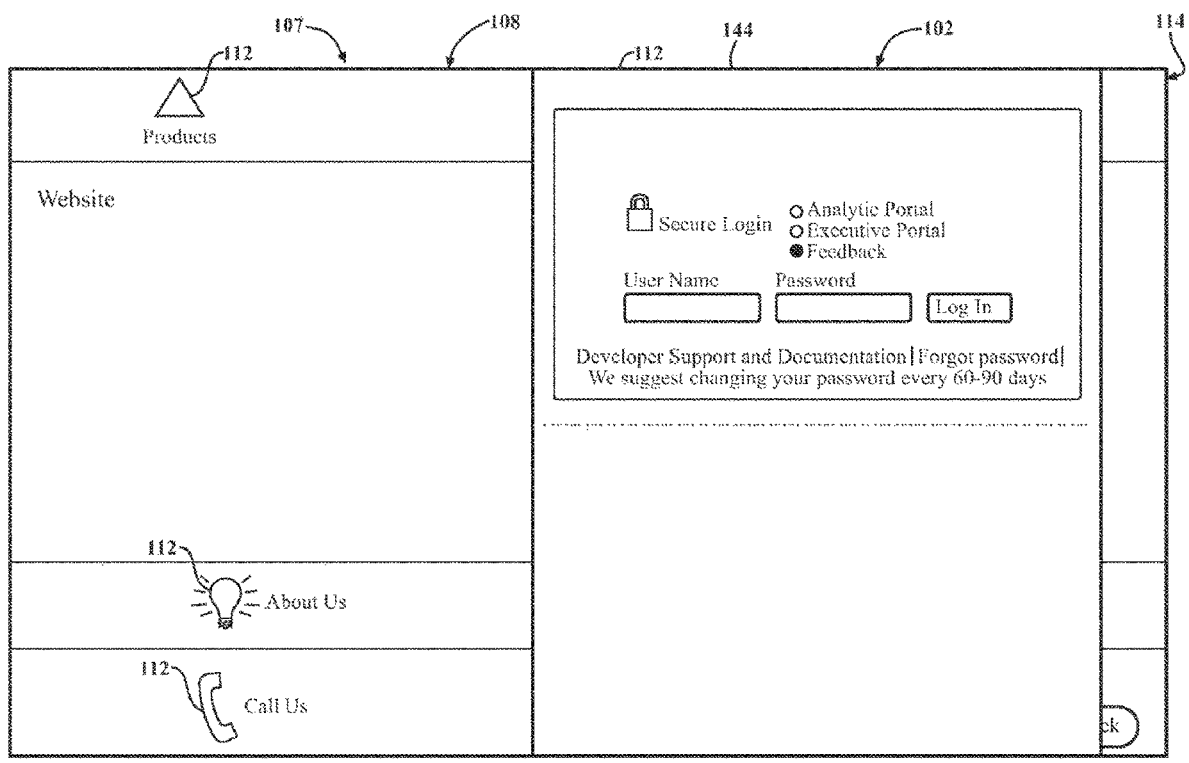
FIG. 9 is a sample screenshot of a login for accessing the in-page console.

As shown in FIG. 9, in some embodiments, the activation procedure includes use of a login 144. The login 144 may require correct input of a username and a password to activate the in-page console 102. The login 144 may be utilized to grant access to the in-page console 102 for a manager, owner, or administrator of the web site. The login 144 may be implemented via a portal. In some embodiments, the login 144 requires only the password to activate the in-page console 102. In some embodiments, the web sewer tracks the login 144 using a login token. In other embodiments, the web server tracks the login 144 using a session cookie. Tracking the login 144 may include maintaining with the web server information related to any actions taken under the username while the in-page console 102 is activated. Activation of the in-page console 102 by the login 144 may be maintained during navigation between different web pages 114 of the plurality of web pages 114. Activation of the in-page console 102 may be maintained via the login token or the session cookie. In some embodiments, activation of the in-page console 102 expires after a defined amount of time, such as a login expiration threshold, has been exceeded.

Figure 10:
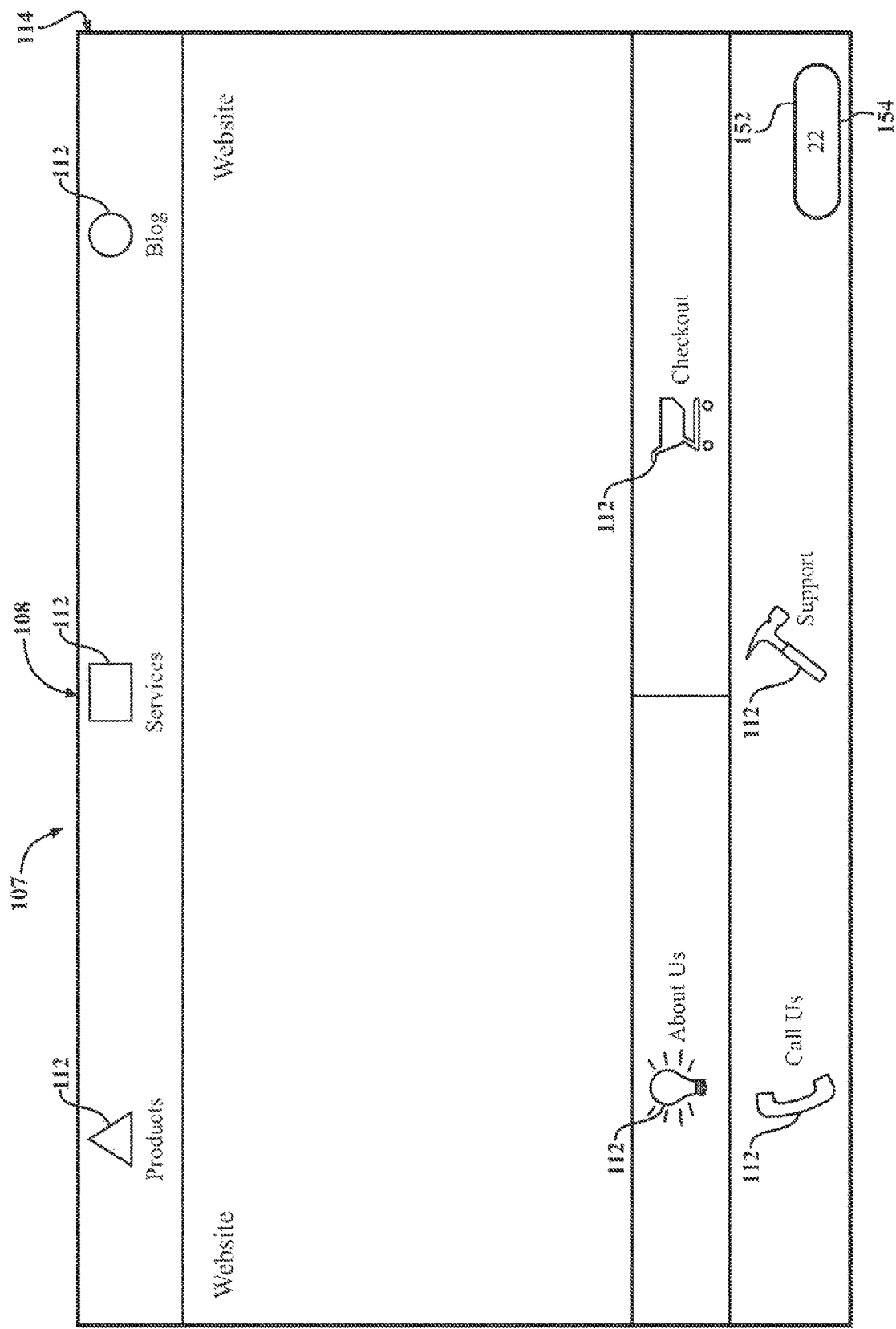
FIG. 10 is a sample screenshot of the web page including a reporting badge.

As shown in FIG. 10, in some embodiments, the survey badge 116 is replaced by a reporting badge 152 after the activation procedure, hi one example, the reporting badge 152 displays a results number 154. The results number 154 is a number of the survey results 104 received tor the web page 114 currently being displayed. The results number 154 allows the owner or the manager of the website to conveniently view the number of survey results 104 received for the web page the owner or the manager is currently viewing and the owner or the manager browses the web pages 114 of the website 108. In some embodiments, the reporting badge 152 is used to open or activate the in-page console 102. The reporting badge 152 is used to open or activate the in-page console 102 by being clicked on or tapped by the manager or the owner.

Figure 11:
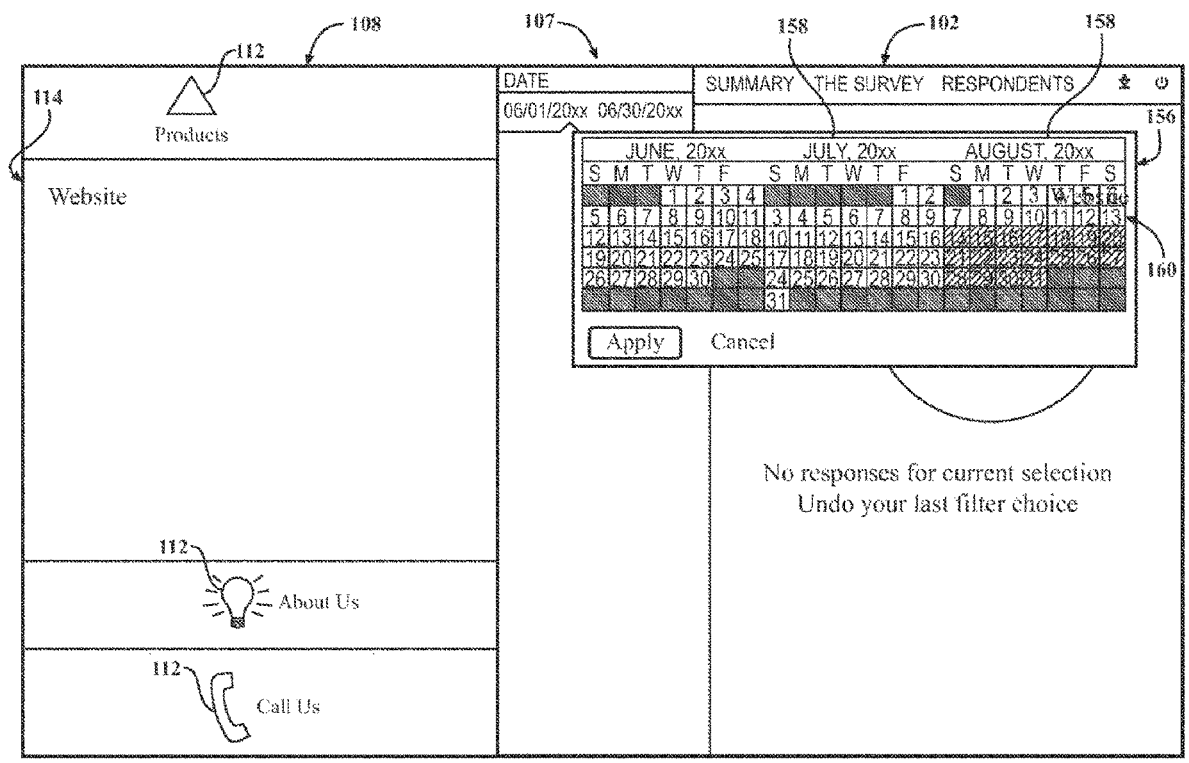
FIG. 11 is a sample screenshot of a calendar view displayed within the in-page console.

As shown in FIG. 11, in some embodiments, the in-page console 102 includes a calendar view 156. The calendar view 156 is displayed within the in-page console 102. The calendar view 156 facilitates aggregated display of the survey results 104. the metadata 128, and/or the analytics 162 from a time period. The time period can be, for example, a plurality of hours, a plurality of days 160, a plurality of weeks, a plurality of months 158 or a combination thereof. Each month of the plurality of months 158 has a plurality of days 160. In some embodiments, the days 160 during which the survey results 104 have been received are visually distinct from the days 160 during which survey results 104 have not been received. The days 160 during which survey results 104 have been received may be differently colored, differently outlined or otherwise distinguished by any suitable visual effect. The days 160 during which survey results 104 have been received may be visually distinct for the currently displayed web page 114, for all of the web pages 114, or for specific web pages 114, such as the currently displayed web page 114 and web pages 114 linked therefrom.

One or more of the days 160 may be selected. When one of the days 160 is selected, the in-page console 102 displays the survey results 104, the metadata 128, the analytics 162, or a combination thereof received during the day that is selected. Several of the days 160 may be selected simultaneously. When several of the days 160 are selected, the in-page console 102 may display the survey results 104, the metadata 128, or a combination thereof individually for each day of the days 160 that are selected. In some embodiments, when several of the days 160 are selected, the in-page console 102 may aggregate the survey results 104, the metadata 128, the analytics 162 or a combination thereof for each of the days 160 that are selected and display the aggregated survey results 104, metadata 128, and/or analytics 162.

Figure 12:
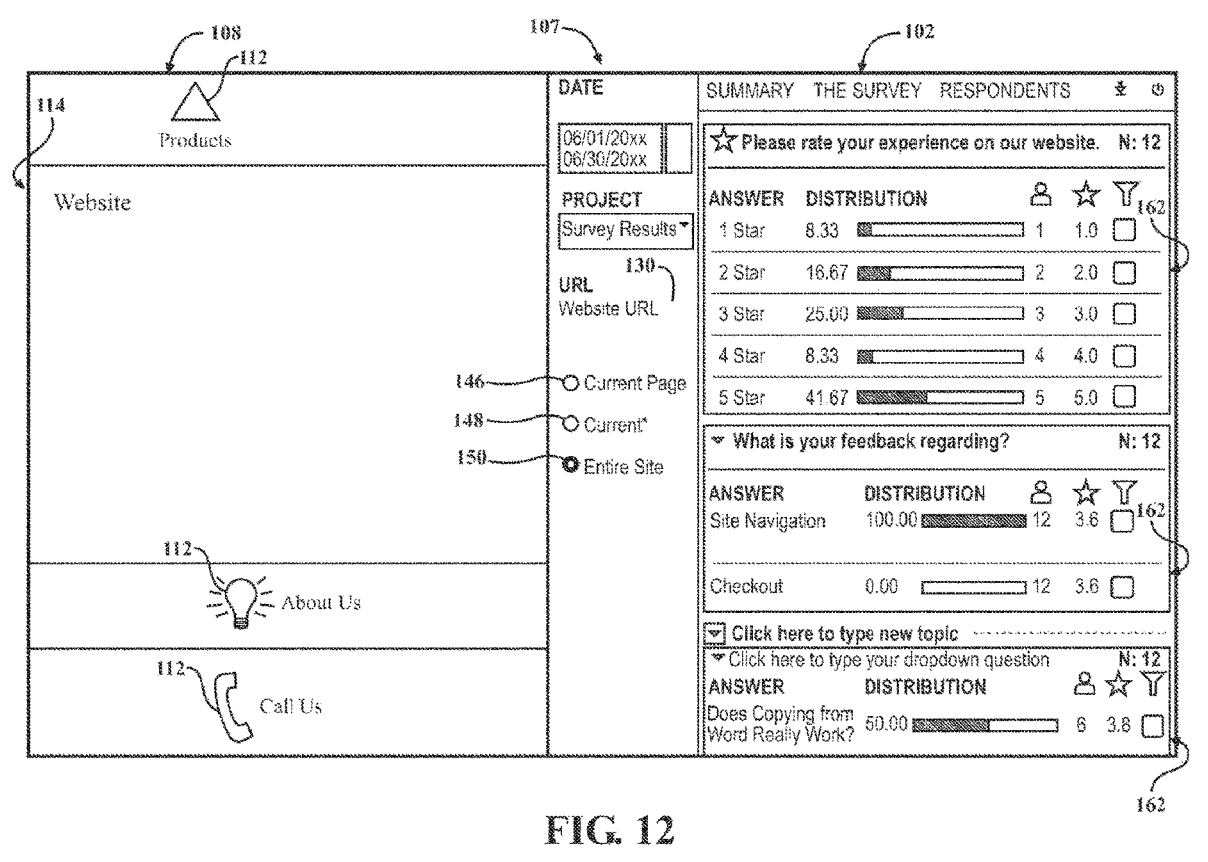
Figure 13:
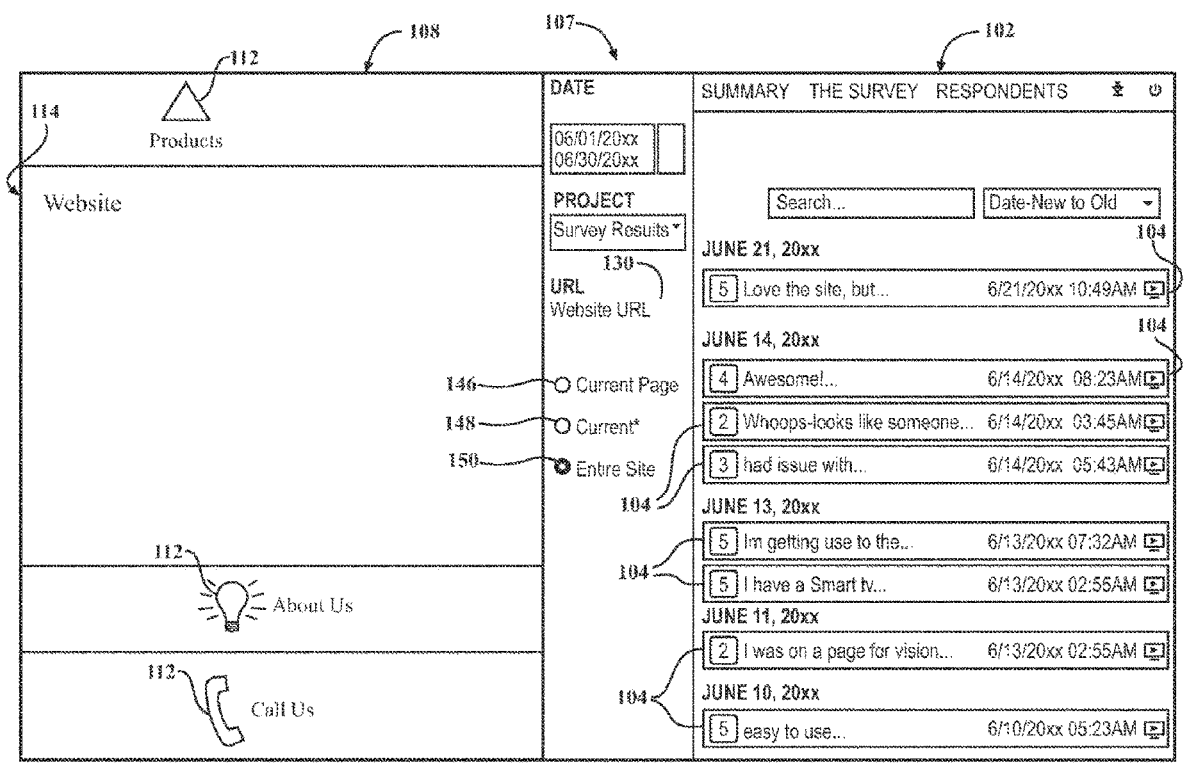
FIG. 13 is a sample screenshot of survey results displayed in the in-page console.

One or more of the months 158 may be selected FIGS. 12 and 13 show aggregated survey results 104 for a selected month. When one of the months 158 is selected, the in-page console 102 displays the survey results 104, the metadata 128, the analytics 162, or a combination thereof received during the month that is selected. Several of the months 158 may be selected simultaneously. When several of the months 158 are selected, the in-page console 102 may display the survey results 104, the metadata 128, the analytics 162, or a combination thereof individually for each month of the months 158 that are selected. In some embodiments, when several of the months 158 are selected, the in-page console 102 may aggregate the survey results 104, the metadata 128, the analytics 162, or a combination thereof for each of the months 158 that are selected and display the aggregated survey results 104, metadata 128, and/or analytics 162.

Figure 14:
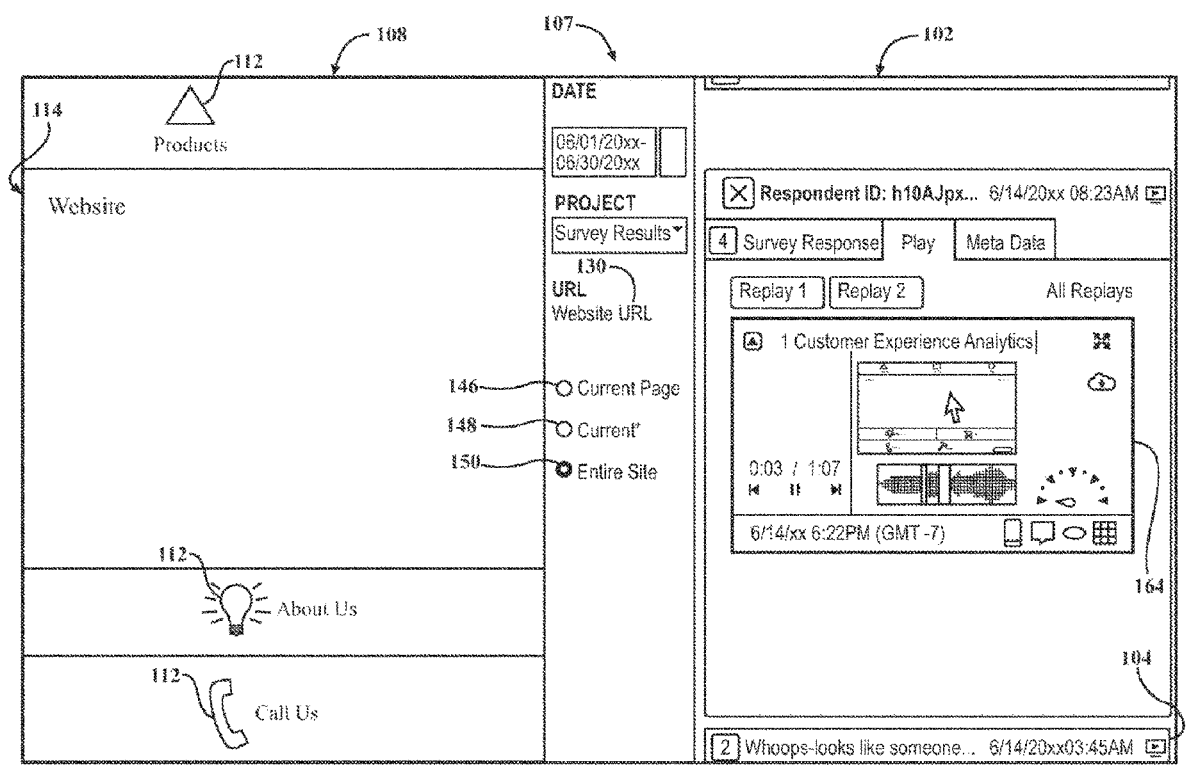
FIG. 14 is a sample screenshot of an example of combining a replay with the survey results to allow interaction data to be shown in the in-page console.

Referring to FIG. 14, in some embodiments, the system 100 includes a replay 164. The replay 164 is a video recording interaction of end users of the website to give context to the survey results 104, the metadata 128, and the analytics 162. The replay 164 is created from interaction data gathered during interaction of an end user with the website 108 before, during, or after submission of the survey results 104. In some embodiments, several replays 164 are recorded. Each of the replays 164 provides context for one or more of the survey results 104. The replays 164 may include recordings of interactions such as mouse movement on a non-mobile web browser, touch interactions on a mobile web browser, interaction with the resources 112, progression between the web pages 114, and any other suitable interaction with the website 108. For example, as an end user of the website 108 navigates the web pages 114, interaction of the end user is recorded, such as time spent on each of the web pages 114, mouse movement, links and resources 112 interacted with by the end user, etc. Examples of systems and methods for remote tracking and replay of user interaction with a webpage are described in U.S. Pat. No. 9,418,172, the entire contents of which are hereby incorporated by reference.

The interaction data may be transmitted to the server 106 with the survey results 104. The survey converts the interaction data into the replay 164 and transmits the replay 164 to the web browser 107 for display within the in-page console 102. In some embodiments, the metadata 128 includes the interaction data. The replay 164 may be transmitted in any suitable video format, such as MP4, HTML5 video, or FLAC. The in-page console 102 may display the replay 164. The replay 164 may be displayed simultaneously with the survey results 104 such that the replay 164 provides context for the survey results 104. In some embodiments, the calendar view 156 allows access to the replays 164, such as by clicking one or more links, buttons or images thereon. As shown in FIG. 14, in embodiments including several replays 164 each of the replays 164 may be associated with one or more survey results 104 and one or more metadata 128. The replays 164 may be associated with the survey results 104 by a common identifier. The common identifier allows the server 106 to display the survey results 104 with the replay 164 associated therewith in the in-page console 102.

Figure 16:
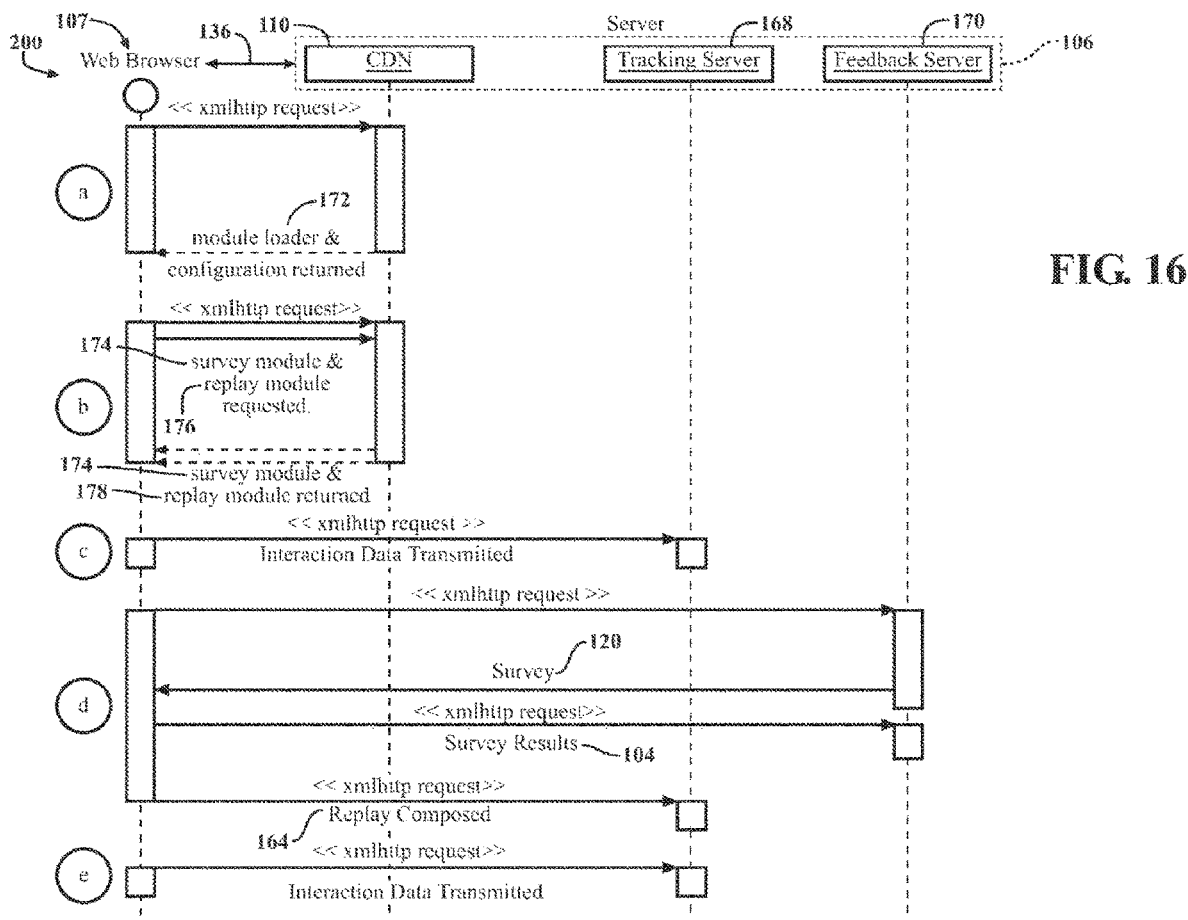
FIG. 16 is a diagram illustrating steps of loading modules on the web browser, transmitting the interaction data front the web browser, returning the survey to the web browser, transmitting the survey results from the web browser, generating the replay based on the interaction data, and continuing to transmit the interaction data after submission of the survey results.

FIG. 16 shows an embodiment of the system 100 allowing transmission of data between the web browser 107 and the server 106 to record the replays 164 and transmit the replays 164 alongside the survey results 104. The server 106 includes the CDN 110, a tracking server 168, and a feedback server 170. The CDN 110 includes a module loader 172, a survey module 174, and a replay module 176. In some embodiments, the survey module 174 includes the replay module 176.

At step a, the web browser 107 requests the module loader 172 and configuration data from the server 106 via XML Http request. The server 106 transmits the module loader 172 and configuration data stored on the CDN 110 to the web browser 107.

At step b, the web browser 107 requests the survey module 174 and the replay module 176 via XML Http Request. The server 106 transmits the survey module 174 and the replay module 176 stored on the CDN to the web browser 107. The web browser 107 loads the survey module 174 and the replay module 176 via the module loader 172. The module loader 172 is code that facilitates transmission of the survey module 174 and the replay module 176 from the CDN 110 to the web browser 107. The module loader 172 is configured to match properties of the web browser 107 such as which website 108 is currently displayed and the type and version of the web browser 107. In some embodiments, the module loader 172 activates upon a DomReady or OnLoad event by the web browser 107. In some embodiments, the module loader 172 loads the survey module 174, the replay module 176, or other modules only if one or more trigger conditions are satisfied. The trigger conditions may include compatibility of the web browser 107 with the survey module 174 or the replay module 176, URL pattern matching, presence of a "Do Not Track" request, compatibility of a computer device on which the web browser 107 is running, and configuration of the survey module 174 or of the replay module 176 for the website 108. In some embodiments, the module loader 172 facilitates transmission of modules other than the survey module 174 and the replay module 176. The replay module 176 is code that facilitates recording of the replay 164 by the web browser 107. The survey module 174 includes code defining the survey badge 116, the survey 120, or a combination thereof. The module loader 172, the survey module 174, and the replay module 176 are stored on the CDN 110 via computer readable media. The module loader 172, the survey module 174, and the replay module 176 are each transmittable to the web browser 107 by the CDN 110 by XML HttpRequest, AJAX request, or any other suitable script or API that facilitates transfer of data. The web browser 107 loads one or more scripts upon loading the web page 114. In some embodiments, the code segment includes the one or more scripts. The scripts point the web browser 107 to the module loader 172. The scripts may point the web browser 107 to the module loader 172 by any suitable means, such as via asynchronous injection or by a third-party tag manager.

At step c, the replay module 176 records interaction data as the website 108 is navigated by an end user and transmits interaction data to the tracking server 168. The interaction may include cursor position, text highlighting, image highlighting, link activation, form filling, form submission, and any other suitable interaction with the website 108. The interaction data may be buffered and transmitted to the server 106 as the website 108 is navigated. The interaction data may be buffered and transmitted as several of the web pages 114 are navigated. The interaction data may be streamed to the server 106 without buffering. In some embodiments, the interaction data is buffered and transmitted to the server 106 intermittently. In some embodiments, the interaction data is buffered and transmitted to the server 106 upon completion of the survey 120.

At step d, the feedback server 170 transmits the survey 120 to the web browser 107, the web browser 107 transmits the survey results 104 to the feedback server 170, and the server 106 composes the replays 164 from the interaction data. The web browser 107 transmits the common identifier with the survey results 104. The server 106 composes one or more of the replays 164 and associates the common identifier with the one or more of the replays 164, thereby associating the survey results 104 with the one or more of the replays 164 composed from the interaction data corresponding to the survey results 104.

At step c, the replay module 176 may continue recording the interaction data after the survey results 104 are transmitted if interaction with the website 108 is continues to occur. The web browser 107 continues sending the interaction data to the server 106. The server 106 processes the interaction data that was received after the survey results 104 are received and lengthens the one or more replays 164 that were previously composed. In some embodiments, the server 106 lengthens the one or more replays 164 that were previously composed after having not received additional interaction data for a predetermined amount of time. In some embodiments, the one or more replays 164 are viewable while interaction data is being recorded.

Figure 17:
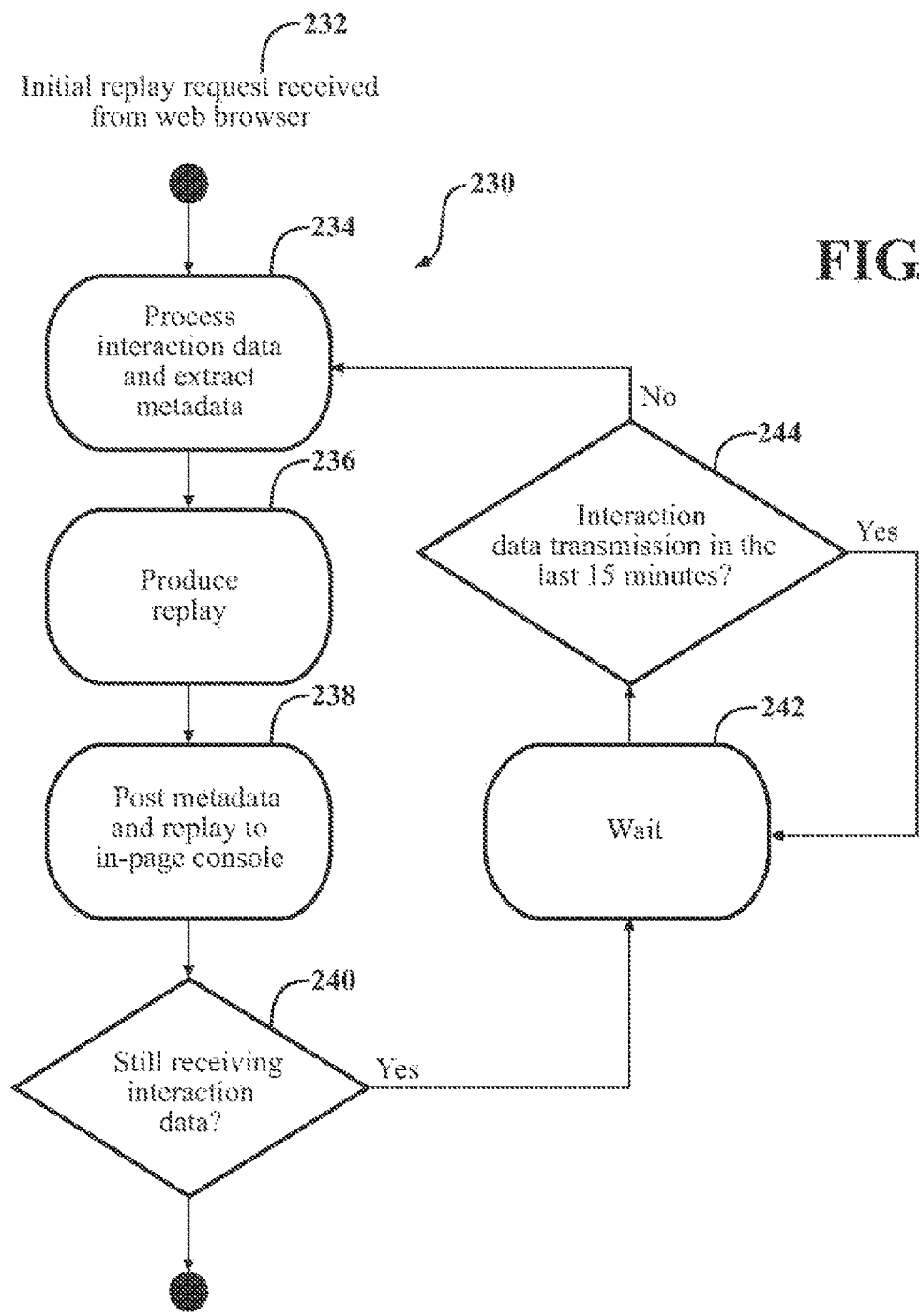
FIG. 17 is a flow chart relating to aspects of generating the replay based on the interaction data, and continuing to transmit the interaction data after submission of the survey results.

FIG. 17 shows a method 232 performed by the server 106 to process the interaction data received from the web browser 107 to compile the replay and handle the interactions data that may still be being received. At step 232, the server 106 receives an initial replay request from the web browser 107. The initial replay request causes the server 106 to start compiling the replay 164. The initial replay request may come from the web browser 107, from the server 106, from the in-page console 102, or from the CDN 110. At step 234, the server 106 processes the interaction data and extracts the metadata 128 from the interaction data. At step 236, the server 106 composes the replay 164 from the interaction data. At step 238, the replay 164 and the metadata 128 are transmitted to the web browser 107 for presentation in the in-page console 102. At step 240, the server 106 makes a decision based upon whether the server 106 is still receiving interaction data. If the server is not still receiving interaction data, the method 232 is finished. If the server 106 is still receiving interaction data, the server 106 moves to step 242. At step 242, the server waits while more interaction data is being received. At step 244, the server 106 checks whether interaction data has been received in a time interval, such as the past 15 minutes. If interaction data has been received within the time interval, the server 106 returns to step 242 and waits for more interaction data to be received. If interaction data has not been received within the time interval, the server 106 proceeds to 234, effectively restarting the method 230 to with processing the interaction data received during the time interval. The replay compiled with the interaction data received during the time interval may be concatenated with the interaction data previously received in order to add to a previously compiled replay. Conversely, the replay compiled with die interaction data received during the time interval may be made into a new replay that may be presented in the in-page console 102 beside the previously compiled replay.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method for presenting user interaction with a website, comprising:
   recording, with a replay module, interaction data captured during user interaction with a selected web page, wherein the interaction data reflects user input during the user interaction;
   processing the interaction data to compose a replay visualization comprising the user input during the user interaction;
   displaying the replay visualization together with the selected web page; and
   displaying survey results simultaneously with the replay visualization, wherein the survey results comprise feedback from users of one or more of the web pages of the website.

2. The method of claim 1, wherein the replay visualization is displayed overlaid on a display of the selected web page.

3. The method of claim 2, wherein the replay visualization includes user mouse movements, user touch interactions, interaction with resources, interaction with links, progression between web pages, or time spent on web pages.

4. The method of claim 2, wherein the recording includes recording of user mouse movements, user touch interactions, user interaction with resources, user interaction with links, user progression between web pages, or time spent by the user on web pages.

5. The method of claim 1, wherein the replay module is provided with a web browser to the user with the selected web page.

6. The method of claim 1, wherein the replay visualization is a video screen recording of the user interaction.

7. The method of claim 6, wherein the replay visualization is associated with the survey by a common identifier.

8. The method of claim 6, wherein the video screen recording is communicated with results of the survey.

9. A non-transitory computer readable medium comprising instructions that, when executed by a processor of a processing system, cause the processing system to perform a method, the method comprising:
   record, with a replay module, interaction data captured during user interaction with a selected web page of a website, wherein the interaction data reflects user input during the user interaction;
   process the interaction data to compose a replay visualization comprising the user input during the user interaction;
   display the replay visualization together with the selected web page; and
   display survey results simultaneously with the replay visualization, wherein the survey results comprise feedback from users of one or more of the web pages of the website.

10. The non-transitory computer readable medium of claim 9, wherein the replay visualization is displayed overlaid on a display of the selected web page.

11. The non-transitory computer readable medium of claim 9, wherein the replay module is provided with a web browser to the user with the selected web page.

12. The non-transitory computer readable medium of claim 9, wherein the replay visualization is associated with a survey completed by the user.

13. The non-transitory computer readable medium of claim 12, wherein the replay visualization is associated with the survey by a common identifier.

14. The non-transitory computer readable medium of claim 12, wherein a video screen recording is communicated with results of the survey.

15. The non-transitory computer readable medium of claim 9, wherein the replay visualization includes user mouse movements, user touch interactions, interaction with resources, interaction with links, progression between web pages, or time spent on web pages.

16. The non-transitory computer readable medium of claim 9, wherein the recording includes recording of user mouse movements, user touch interactions, user interaction with resources, user interaction with links, user progression between web pages, or time spent by the user on web pages.

17. A system for reviewing user interaction with a web page, comprising:
a memory comprising executable instructions;
a processor of a processing system that is configured to execute the executable instructions and cause the processing system to:
record, with a replay module, interaction data captured during user interaction with a selected web page of a website, wherein the interaction data reflects user input during the user interaction;
process the interaction data to compose a replay visualization comprising the user input during the user interaction;
display the replay visualization together with the selected web page; and
display survey results simultaneously with the replay visualization, wherein the survey results comprise feedback from users of one or more of the web pages of the website.

18. The system of claim 17, wherein the replay visualization is displayed overlaid on a display of the selected web page.

19. The system of claim 17, wherein the replay module is provided with a web browser to the user with the selected web page.

20. The system of claim 17, wherein the replay visualization is a video screen recording of the user interaction.

21. The system of claim 20, wherein the replay visualization is associated with the survey by a common identifier.

22. The system of claim 20, wherein the video screen recording is communicated with results of the survey.

23. The system of claim 17, wherein the replay visualization includes user mouse movements, user touch interactions, interaction with resources, interaction with links, progression between web pages, or time spent on web pages.

24. The system of claim 17, wherein the recording includes recording of user mouse movements, user touch interactions, user interaction with resources, user interaction with links, user progression between web pages, or time spent by the user on web pages.

* * * * *